J. P. SMITH.
Axle-Boxes for Vehicles.

No. 136,778.  Patented March 11, 1873.

Witnesses:
Edmund Masson
John R. Young

Inventor:
James P. Smith, by
Prindle and Son his Attys

AM. PHOTO-LITHOGRAPHIC CO. N.Y.(OSBORNE'S PROCESS.)

UNITED STATES PATENT OFFICE.

JAMES P. SMITH, OF TERRE HAUTE, INDIANA.

IMPROVEMENT IN AXLE-BOXES FOR VEHICLES.

Specification forming part of Letters Patent No. 136,778, dated March 11, 1873.

*To all whom it may concern:*

Be it known that I, JAMES P. SMITH, of Terre Haute, in the county of Vigo and State of Indiana, have invented certain new and useful Improvements in Anti-Friction Axle-Boxes; and do hereby declare that the following is a full, clear, and exact description thereof, reference being had to the accompanying drawing making a part of this specification, in which—

Figure 1:
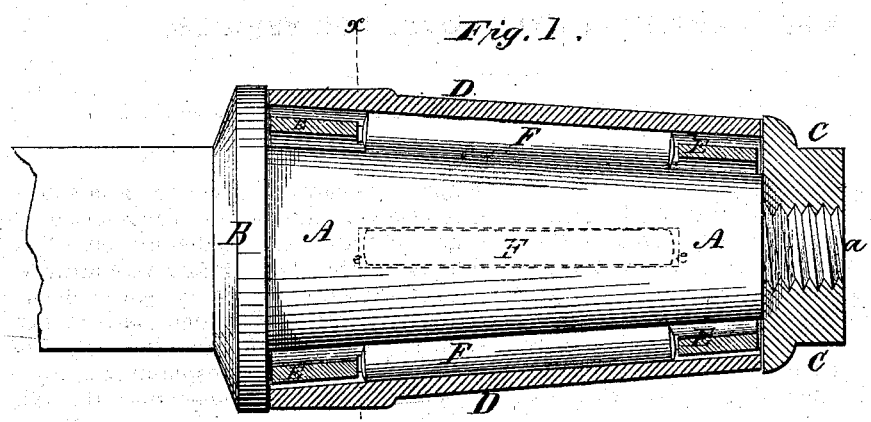
Figure 2:
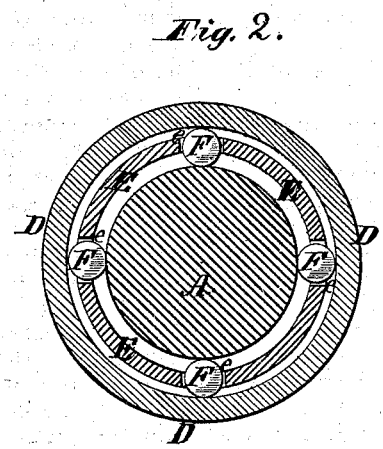

Figure 1 is a longitudinal central section of my improved device as applied to an axle, and Fig. 2 is a cross-section of the same on line *x* *x* of Fig. 1.

Letters of like name and kind refer to like parts in each of the figures.

The design of my invention is to lessen the friction between the hub of a wheel and the axle arm or bearing; and it consists in the peculiar construction and combination of the various parts of the device, substantially as and for the purpose hereinafter specified.

In the annexed drawing, A represents an axle-arm provided upon its inner end with a fixed collar, B, and upon its outer threaded-end *a* with a nut, C, which forms a detachable collar, all in the usual manner. Surrounding the axle-arm A and extending between the collars B and C is an axle-skein, D, which has the usual form, but is about one inch larger in interior dimensions than said axle-arm so as to leave between their surfaces a space of about one-half inch. Within the space left between the axle-arm and skein is placed a sleeve, E, which has a thickness of about one-fourth of an inch, and such a diameter and shape as to cause it to occupy a position midway between said parts. Three or more slots, *e*, are provided at equidistant points within the wall of the sleeve E and extending lengthwise of the same to a point near each end contain each a roller, F, which has a length substantially equal to the like dimensions of said slot and a diameter corresponding to the radial dimensions of the space between the axle arm and skein.

As thus arranged the whole weight of the load upon the axle is thrown upon the rollers, which are kept in relative positions by the sleeve or shell, by which means a rolling bearing is produced, and the usual friction caused by the rubbing together of the axle arm and skein is avoided.

I am aware that friction-rollers are old and have been employed in various ways for the purpose of lessening friction, and that, therefore, broadly they are not my invention.

Having thus fully set forth the nature and merits of my invention, what I claim as new is—

In combination with the axle-arm A and axle-skein D, the sleeve E provided with the slots *e* and containing the rollers F, substantially as and for the purpose specified.

In testimony that I claim the foregoing I have hereunto set my hand this 30th day of January, 1872.

JAMES P. SMITH.

Witnesses:
TOM. A. BROWN,
T. W. STEWART.